United States Patent
Fairbanks, Jr. et al.

(10) Patent No.: US 7,647,294 B2
(45) Date of Patent: Jan. 12, 2010

(54) INDEXING AND QUERYING ENGINES AND METHODS OF INDEXING AND QUERYING

(76) Inventors: William E. Fairbanks, Jr., 4253 Hunt Dr., #3002, Carrollton, TX (US) 75010; Jason French, 186 Spinner, Honesdale, PA (US) 18431

( * ) Notice: Subject to any disclaimer, the term of this patent is extended or adjusted under 35 U.S.C. 154(b) by 310 days.

(21) Appl. No.: 11/259,405

(22) Filed: Oct. 26, 2005

(65) Prior Publication Data

US 2006/0089927 A1    Apr. 27, 2006

Related U.S. Application Data

(60) Provisional application No. 60/622,474, filed on Oct. 27, 2004.

(51) Int. Cl.
*G06F 17/30* (2006.01)
*G06F 7/00* (2006.01)

(52) U.S. Cl. .................. 707/2; 707/5
(58) Field of Classification Search ............ None
See application file for complete search history.

(56) References Cited

U.S. PATENT DOCUMENTS

| | | | | |
|---|---|---|---|---|
| 1,261,167 A * | 4/1918 | Russell | ............ | 40/384 |
| 4,453,217 A * | 6/1984 | Boivie | ............ | 707/5 |
| 4,833,610 A * | 5/1989 | Zamora et al. | ............ | 707/5 |
| 5,606,690 A * | 2/1997 | Hunter et al. | ............ | 707/5 |
| 5,619,709 A * | 4/1997 | Caid et al. | ............ | 715/209 |
| 5,724,597 A * | 3/1998 | Cuthbertson et al. | ............ | 715/201 |
| 5,737,723 A * | 4/1998 | Riley et al. | ............ | 704/243 |
| 5,761,388 A * | 6/1998 | Nomoto et al. | ............ | 706/52 |
| 6,018,736 A * | 1/2000 | Gilai et al. | ............ | 707/6 |
| 6,026,398 A * | 2/2000 | Brown et al. | ............ | 707/5 |
| 6,105,023 A * | 8/2000 | Callan | ............ | 707/5 |
| 6,134,532 A * | 10/2000 | Lazarus et al. | ............ | 705/14 |
| 6,256,630 B1 * | 7/2001 | Gilai et al. | ............ | 707/6 |
| 6,924,822 B2 * | 8/2005 | Card et al. | ............ | 345/660 |
| 6,963,871 B1 * | 11/2005 | Hermansen et al. | ............ | 707/6 |
| 7,015,910 B2 * | 3/2006 | Card et al. | ............ | 345/427 |
| 7,069,518 B2 * | 6/2006 | Card et al. | ............ | 715/776 |
| 7,139,982 B2 * | 11/2006 | Card et al. | ............ | 715/786 |
| 7,240,291 B2 * | 7/2007 | Card et al. | ............ | 715/776 |
| 7,248,269 B2 * | 7/2007 | Card et al. | ............ | 345/660 |
| 7,493,572 B2 * | 2/2009 | Card et al. | ............ | 715/850 |
| 2002/0083101 A1 * | 6/2002 | Card et al. | ............ | 707/526 |
| 2002/0099536 A1 * | 7/2002 | Bordner et al. | ............ | 704/10 |
| 2002/0113802 A1 * | 8/2002 | Card et al. | ............ | 345/619 |
| 2002/0113823 A1 * | 8/2002 | Card et al. | ............ | 345/776 |
| 2002/0118230 A1 * | 8/2002 | Card et al. | ............ | 345/776 |

(Continued)

OTHER PUBLICATIONS

Pollock, J.J. and A. Zamora "Automatic Spelling Correction in Scientific and Scholarly Text", Communications of the ACM, vol. 27, No. 4, Apr. 1984, pp. 358-368.*

(Continued)

*Primary Examiner*—Luke S Wassum

(57) ABSTRACT

A query engine, an indexing engine and methods of indexing and querying data. In one embodiment, the present invention provides a query engine for searching data including an artificial intelligence controller configured to select an appropriate combination of fuzzy logic and conventional logic based on query information and employ the combination to compare at least one element of the data with at least a portion of the query information to provide a comparison result.

13 Claims, 4 Drawing Sheets

U.S. PATENT DOCUMENTS

| | | | |
|---|---|---|---|
| 2002/0178002 A1* | 11/2002 | Boguraev et al. | 704/235 |
| 2003/0052900 A1* | 3/2003 | Card et al. | 345/660 |
| 2003/0172066 A1* | 9/2003 | Cooper et al. | 707/7 |
| 2004/0153407 A1* | 8/2004 | Clubb et al. | 705/41 |
| 2004/0260694 A1* | 12/2004 | Chaudhuri et al. | 707/5 |
| 2005/0005245 A1* | 1/2005 | Card et al. | 715/776 |
| 2005/0005246 A1* | 1/2005 | Card et al. | 715/776 |
| 2005/0273468 A1* | 12/2005 | Hermansen et al. | 707/100 |
| 2007/0005567 A1* | 1/2007 | Hermansen et al. | 707/3 |
| 2008/0133522 A1* | 6/2008 | Bordner et al. | 707/6 |

OTHER PUBLICATIONS

Kerre, E.E., R.B.R.C. Zenner and R.M.M. De Caluwe "The Use of Fuzzy Set Theory in Information Retrieval and Databases: A Survey", Journal of the American Society for Information Science, vol. 37, No. 5, 1986, pp. 341-345.*

Manber, U. and S. Wu "Glimpse: A Tool to Search Through Entire File Systems", Technical Report TR-93-34, Department of Computer Science, University of Arizona, Oct. 1993.*

Zobel, J. and P. Dart "Phonetic String Matching: Lessons from Information Retrieval", Proceedings of the 19$^{th}$ Annual International ACM SIGIR Conference on Research and Development in Information Retrieval, 1996, pp. 166-172.*

Rapp, R. "Text-Detector", c't, Apr. 1997, downloaded from www.heise.de/ct/english.*

Araújo, M.D., G. Navarro and N. Ziviani "Large Text Searching Allowing Errors", Proceedings of the 4$^{th}$ South American Workshop on String Processing (WSP'97), Nov. 12-13, 1997.*

Baeza-Yates, R. and G. Navarro "Block Addressing Indices for Approximate Text Retrieval", Proceedings of the 6$^{th}$ International Conference on Information and Knowledge Management, 1997, pp. 1-8.*

Hermansen, S.W. "Fuzzy Key Linkage", Proceedings of the Southeast SAS Users Group (SESUG) Annual Meeting, Institute for Advanced Analytics, NC State University, 2001.*

Navarro, G. "A Guided Tour to Approximate String Matching", ACM Computing Surveys, vol. 33, No. 1, 2001, pp. 31-88.*

Choi, D-Y. "Integration of Document Index with Perception Index", Soft Computing—A Fusion of Foundations, Methodologies and Applications, vol. 6, No. 5, Aug. 2002, pp. 300-307.*

Williams, J. and N. Steele "Difference, Distance and Similarity as a Basis for Fuzzy Decision Support Based on Prototypical Decision Classes", Fuzzy Sets and Systems, vol. 131, 2002, pp. 35-46.* askSam "askSam 3 Reference Manual", Chapter 8, downloaded from www.asksam.com, Jun. 28, 2003.*

Nelson, A. "Implement Phonetic ("Sounds-Like") Name Searches with Double Metaphone Part I: Introduction & C++ Implementation", downloaded from www.codeproject.com, Jul. 2003.*

Nelson, A. "Implement Phonetic ("Sounds-Like") Name Searches with Double Metaphone Part II: Visual Basic and Relational Database Solution", downloaded from www.codeproject.com, Jul. 2003.*

Nelson, A. "Implement Phonetic ("Sounds-Like") Name Searches with Double Metaphone Part III: VBScript and ASP & Database Solutions", downloaded from www.codeproject.com, Jul. 2003.*

Nelson, A. "Implement Phonetic ("Sounds-Like") Name Searches with Double Metaphone Part IV: SQL Server and Advanced Database Topics", downloaded from www.codeproject.com, Jul. 2003.*

Nelson, A. "Implement Phonetic ("Sounds-Like") Name Searches with Double Metaphone Part V: .NET Implementation", downloaded from www.codeproject.com, Jul. 2003.*

Nelson, A. "Implement Phonetic ("Sounds-Like") Name Searches with Double Metaphone Part VI: Other Methods & Additional Resources", downloaded from www.codeproject.com, Jul. 2003.*

Nikravesh, M. "Beyond the Semantic Web: Fuzzy Logic-Based Web Intelligence", Studies in Fuzziness and Soft Computing, vol. 204, 2006, pp. 149-209.*

Hall, P.A.V. and G.R. Dowling "Approximate String Matching", ACM Computing Surveys, vol. 12, No. 4, Dec. 1980, pp. 381-402.*

Navarro, G., R. Baeza-Yates, E. Sutinen and J. Tarhio "Indexing Methods for Approximate String Matching", Bulletin of the IEEE Computer Society Technical Committee on Data Engineering, 2001.*

Bartolini, I., P. Ciaccia and M. Patella "String Matching with Metric Trees Using an Approximate Distance", String Processing and Information Retrieval, Lecture Notes in Computer Science, vol. 2476, 2002, pp. 271-283.*

Gabriele, A., F. Mignosi, A. Restivo and M. Sciortino "Indexing Structures for Approximate String Matching", Algorithms and Complexity, Lecture Notes in Computer Science, vol. 2653, Jan. 2003, pp. 140-151.*

Chaudhuri, S., K. Ganjam, V. Ganti and R. Motwani "Robust and Efficient Fuzzy Match for Online Data Cleaning", Proceedings of the ACM SIGMOD Conference on Management of Data, Jun. 9-12, 2003, pp. 313-324.*

Navarro, G. and E. Chavez "A Metric Index for Approximate String Matching", Theoretical Computer Science, vol. 352, 2006, pp. 266-279.*

* cited by examiner

INDEXING AND QUERYING ENGINES AND METHODS OF INDEXING AND QUERYING

CROSS-REFERENCE TO RELATED APPLICATION

The present invention claims the benefit of U.S. Provisional Application No. 60/622,474, filed on Oct. 27, 2004, and entitled "Fuzzy Logic Indexing and Querying." The provisional application is incorporated herein by reference in its entirety.

TECHNICAL FIELD OF THE INVENTION

The present invention is directed, in general, to database indexing and querying and, more specifically, to building an index and querying an index employing fuzzy comparisons.

BACKGROUND OF THE INVENTION

Gathering and retaining information associated with such broad topics including equipment, business transactions, medical records, people, etc., has increased over the years as computers have made it easier to store, manipulate and gather the information (i.e., data). Databases are now maintained to track everything from business trends to terrorists.

To organize and improve access to the data stored in databases, the data is often indexed. Typically, an indexing technique generates a key for each element of the data (i.e., data strings in the database) to be indexed and then uses an available indexing structure, such as, Binary Tree, B-Tree, etc., to assign the keys to index nodes. In equality indexing, the data strings themselves act as the key for indexing. In conventional fuzzy indexing systems, the key is generated using an algorithm, such as, SOUNDEX, METAPHONE, etc.

For example, using SOUNDEX, the data string "JULIANO" is keyed as JLN and the data string "JUKIANO" is keyed as JKN. The two different keys JLN and JKN are then indexed in two different nodes. Thus, while conventional fuzzy indexing systems may provide a broader indexing system, in some instances, the keys generated by fuzzy indexing system may be assigned to separate nodes just as in equality indexing. Accordingly, using the SOUNDEX indexing technique, a query does not result in a match for JULIANO and JUKIANO while these data strings may simply be the result of typographical errors. Errors in databases can be caused by both manual and automatic data entry. When subsequent searches fail to find relevant data records, information may be missed or duplicated in a database system. This may result in inaccurate or missing information and prevent a complete picture of a customer's, patient's or terrorist's activity within the database system.

As mentioned above, conventional fuzzy indexing systems, such as, SOUNDEX, METAPHONE and DOUBLE METAPHONE, are used in the data warehousing industry to index data. Even the logic of conventional fuzzy indexing systems, however, may not associate data strings with the same nodes of an index and are not powerful enough to match strings such as JOHN and DON, or DAVID and DACID.

Accordingly, what is needed in the art is improved systems and methods for indexing and querying databases that allows matching data strings even when the data strings are not exactly equal.

SUMMARY OF THE INVENTION

To address the above-discussed deficiencies of the prior art, the present invention provides a query engine, an indexing engine and methods of indexing and querying data. In one embodiment, the present invention provides a query engine for searching data including an artificial intelligence controller configured to select an appropriate combination of fuzzy logic and conventional logic based on query information and employ the combination to compare at least one element of the data with at least a portion of the query information to provide a comparison result.

The data is a collection of data elements (i.e., data strings). Typically, the data elements are organized into rows and columns with each column representing a particular attribute and each row representing a particular record. The data elements may be various types including an alpha-numeric string, an alpha string, a numeric string or multiple component strings. In a multiple component string, multiple data strings are processed as a single data string. The multiple data strings may include various types of data strings. Thus, for example, the attributes of a single data record may be processed as a single multiple component string. As such, an entire address (including street number, street name, zip code, etc.) can be treated as in a single column.

The query information includes a value (query value) that is sought in the data. In preferred embodiments, the query information also includes a query matching value that represents a desired percentage for matching the query value. For example, the query value may be JOHN. If the query matching value is 100%, the query engine may provide a comparison result (i.e., output of a query) that includes each JOHN that was located. If the query matching value is 80%, the query engine may provide additional fuzzy matches such as JON. Additionally, if the query matching value is 50%, the query engine may provide a comparison result that includes DON. Thus, JOHN and JOHN can be a 100% match, JOHN and JON may be an 80% match and JOHN and DON may be a 50%. The present invention, therefore, has the ability to index and query more than just names or numbers. The present invention provides the ability to locate data records with poor data quality including data records with part numbers.

In another aspect, the present invention provides an indexing engine for creating an index of data including: (1) a key constructor configured to generate fuzzy keys for the data and (2) an index generator configured to employ a combination of fuzzy logic and conventional logic to establish relationships between the fuzzy keys and designate the fuzzy keys to nodes of an index.

In yet another aspect, the present invention provides a method of querying data including: (1) receiving query information associated with the data, (2) selecting an appropriate combination of fuzzy logic and conventional logic based on the query information, (3) comparing at least one element of the data with at least a portion of the query information employing the combination and (4) providing a comparison result based on the comparing.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
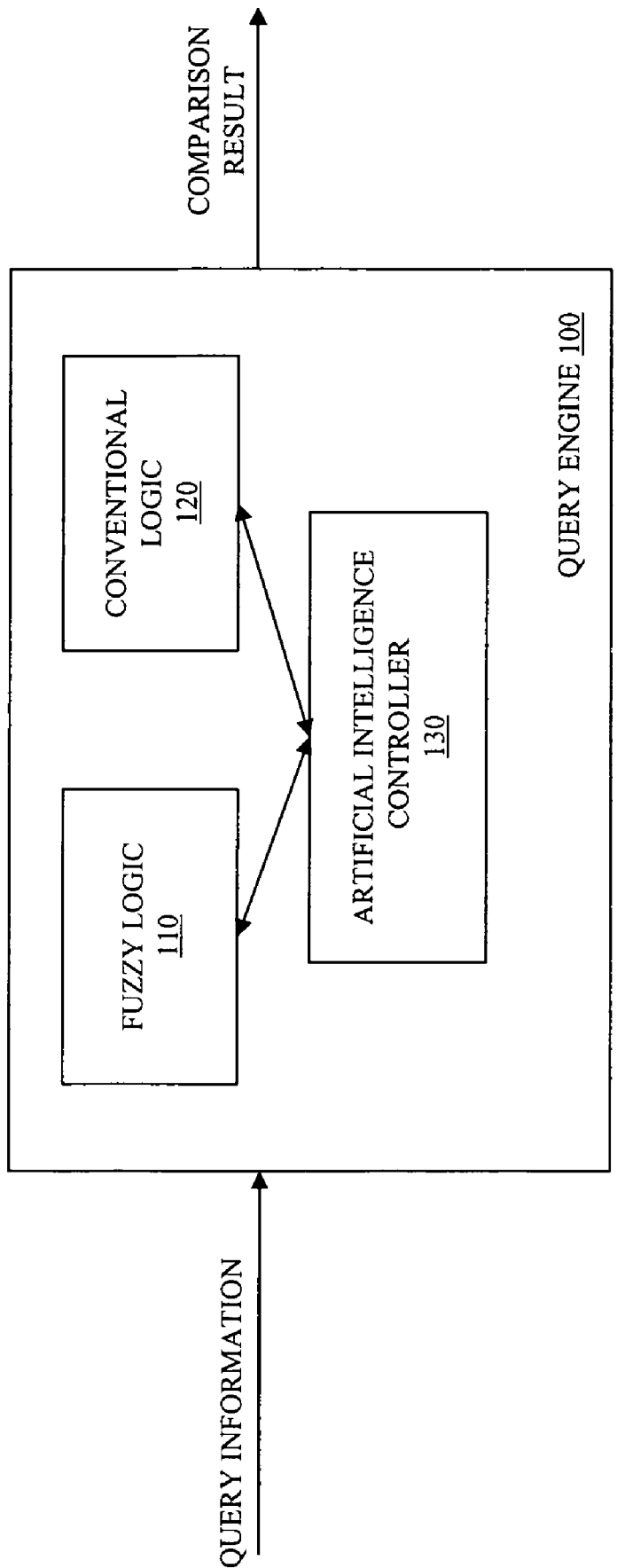
FIG. 1 illustrates a block diagram of an embodiment of a query engine constructed according to the principles of the present invention.

Referring initially to FIG. 1, illustrated is a query engine, generally designated 100, constructed according to the principles of the present invention. The query engine 100 includes fuzzy logic 110, conventional logic 120 and an artificial intelligence (AI) controller 130. One skilled in the art will understand that the query engine 100 includes additional components typically included in conventional query engines that are not pertinent to the present invention. For example, one skilled in the art will understand that the query engine 100 includes interfaces to receive and distribute information. The query engine 100 may be implemented as a series of operating instructions, as dedicated hardware or as a combination thereof. In one embodiment, the query engine 100 may be a dedicated computer, such as a server.

The query engine 100 is configured to search for data based on query information. The data may be stored in a particular database, multiple databases or distributed across a network. For example, the query engine 100 may be employed as a web search engine for the Internet. By employing a combination of the fuzzy logic 110 and the conventional logic 120, the query engine 100 provides a fuzzy key comparison technique that allows matching of strings with errors such as, insertions, mismatches and transposes. Additionally, the query engine 100 is configured to return a percentage on which the data matches. The data element may be an alpha-numeric string, an alpha string, a numeric string or a multiple component string.

The fuzzy logic 110 is a system of logic dealing with the concept of partial truths. Instead of having values limited to either 1 or 0 such as with Boolean systems, the fuzzy logic 110 allows truth values that are real values in the closed interval [0 . . . 1]. Accordingly, the fuzzy logic 110 can provide values ranging between "completely true" and "completely false." The fuzzy logic 110 may be implemented as a series of operating instructions, as dedicated hardware or as a combination thereof. The fuzzy logic 110 may include approximate string matching algorithms, searching logic algorithms or a combination of each. One skilled in the art will understand the general concept of a fuzzy logic system.

The conventional logic 120 is a system of Boolean logic dealing with absolute truths. Unlike the fuzzy logic 110, the conventional logic has values limited to either 1 or 0. The conventional logic 110 may be implemented as a series of operating instructions, as dedicated hardware or as a combination thereof. The fuzzy logic 110 may employ normal equality check algorithms, minimum inequality check algorithms or a combination of each. One skilled in the art will understand the general concept of a conventional logic system.

The AI controller 130 is configured to select an appropriate combination of logic from the fuzzy logic 110 and the conventional logic 120 to compare at least one element of the data with at least a portion of the query information to provide a comparison result. The AI controller 130 is coupled to both the fuzzy logic 110 and the conventional logic 120. The AI controller 130 may be implemented as a series of operating instructions, as dedicated hardware or as a combination thereof. The query information includes at least one query element value and at least one query matching value. In some embodiments, the query matching value is a percentage. Of course, the query information may include multiple query element values and multiple query matching values.

In one embodiment, the AI controller 130 provides the comparison result based on one query matching value. Accordingly, the AI controller 130 bases the combination on the single query matching value. In other embodiments, the AI controller 130 provides the comparison result based on multiple query element values and multiple query matching values. Additionally, when the data element is a multiple component string, the AI controller 130 may consider priorities associated with one or more of the components (for example, attributes) of the multiple component string when comparing the data element to the query information.

Figure 2:
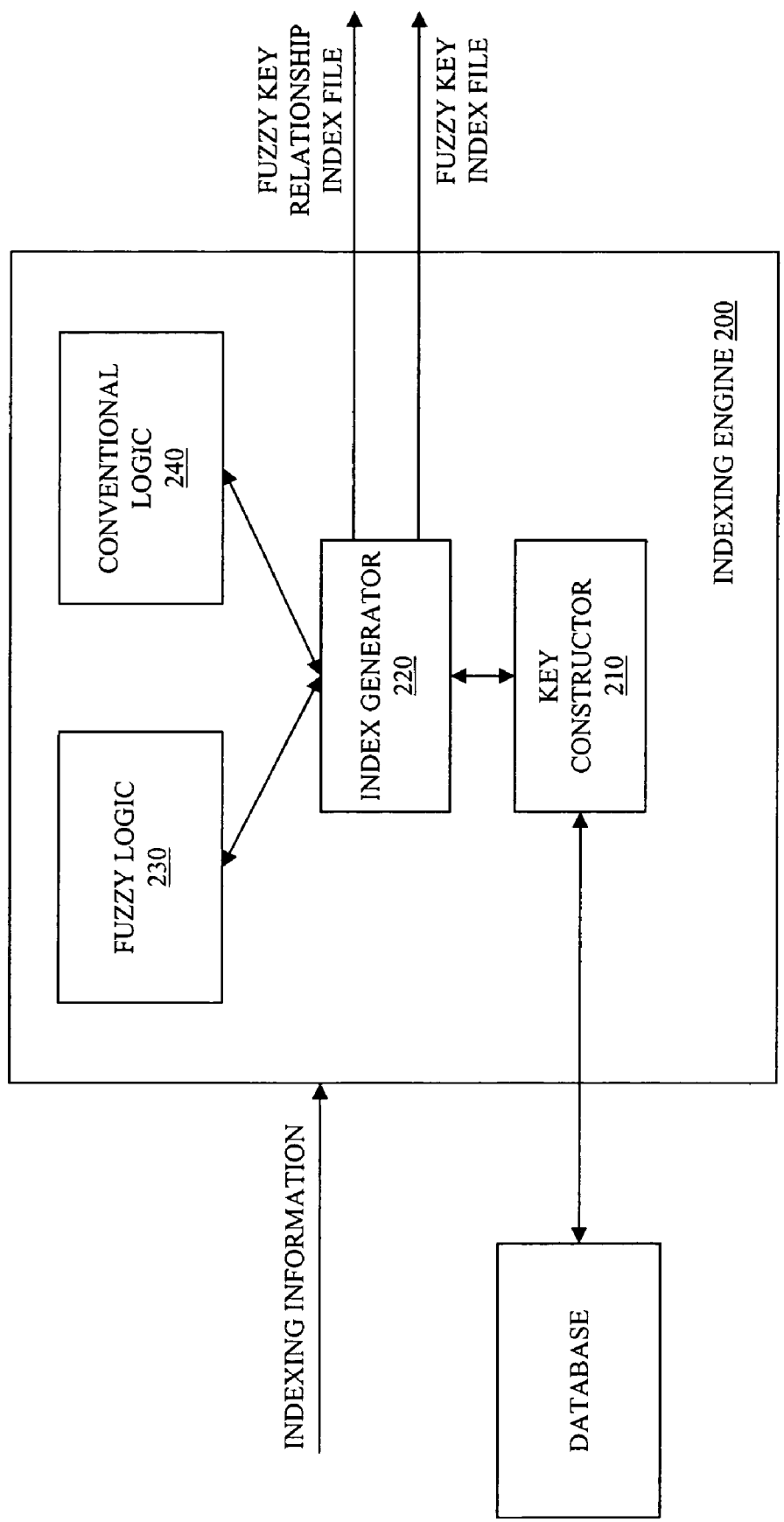
FIG. 2 illustrates a block diagram of an embodiment of an indexing engine constructed according to the principles of the present invention.

Turning now to FIG. 2, illustrated is an indexing engine, generally designated 200, constructed according to the principles of the present invention. The indexing engine 200 includes a key constructor 210, an index generator 220, fuzzy logic 230 and conventional logic 240. The fuzzy logic 230 and the conventional logic 240 may include the fuzzy and conventional algorithms, respectively, as described with respect to the fuzzy logic 110 and the conventional logic 120 of FIG. 1. In some embodiments, the fuzzy logic 230 and the conventional logic 240 may be the fuzzy logic 110 and the conventional logic 120 of the query engine 100. Additionally, one skilled in the art will understand that the indexing engine 200 may also include additional components typically included within a conventional indexing system.

The indexing engine 200 is configured to create an index of data. The indexing engine 200 may be implemented as a series of operating instructions, as dedicated hardware or as a combination thereof. In some embodiments, the indexing engine 200 and the query engine 100 may be implemented in a single computing device. The indexing engine 200 is configured to receive indexing information to be employed for creating the index. The indexing information may include instructions for which database or databases to index, what portion of the database to index, where to store the index or indexes when created. Additionally, the indexing information may include additional instructions or directions for indexing. For example, the indexing information may include instructions for establishing relationships for fuzzy keys, such as, match scoring or what algorithms to employ. The indexing information or portions of the indexing information may be entered at various times. The indexing information may be entered by a user at a time of indexing or can be entered when the indexing engine 200 is constructed.

The index can be created for all of the data or for a portion of the data. For example, the indexing engine 200 may create an index of only one column of the data. Additionally, the indexing engine 200 may create an index of multiple columns of the data. The data may be from a particular database, multiple databases or distributed across a network as discussed above. In one embodiment, the data is from a flat file and the indexing engine 200 stores the created index in the flat file.

The key constructor 210 is configured to generate fuzzy keys for the data. A fuzzy key is generated for each data element to be indexed. The fuzzy keys may be generated employing techniques, such as, vowel replacement, phonetic replacement, etc. The key constructor 210 may employ conventional techniques for generating the fuzzy keys including but not limited to SOUNDEX or METAPHONE algorithms.

The index generator 220 is configured to employ a combination of the fuzzy logic 230 and the conventional logic 240 to establish relationships between the fuzzy keys and designate the fuzzy keys to nodes of the index. The combination may be determined and established based on the type of data. Thus, portions of the fuzzy logic 230 or conventional logic 240 may be designated for certain types of data. For example, specific algorithms may be created and then designated to establish the relationships for certain data types.

Accordingly, appropriate algorithms may be employed as a basis for the relationships. Similarly, regarding the query engine 100 of FIG. 1, certain portions of the fuzzy logic 110 and conventional logic 120 may be designated for certain query values. The index generator 220 may establish relationships between the fuzzy keys based on user or system-defined match scoring. The match scoring may be based on matching percentages established by the user or the system. For example, the index generator 220 may establish that a relationship between two fuzzy keys is at 80% (i.e., JOHN and JON). The index generator 220 may employ the fuzzy logic 220 to provide this match of 80%.

In the illustrated embodiment of FIG. 2, the index generator 220 creates a fuzzy key index file and a fuzzy key relationship index file when establishing the relationships and designating the fuzzy keys. The fuzzy key index file includes the fuzzy keys in sorted indexed order. In one embodiment, the fuzzy key index file may also include the actual data elements that can be used to establish exact matches when querying. The fuzzy key relationship index file includes the relationships of the fuzzy keys. When querying the data, the fuzzy key relationship index file can be searched first to determine matching nodes. Subsequently, the fuzzy key index file may be searched to determine matching records. Accordingly, employing these index files can limit searching larger parts of an index resulting in faster querying of data.

Figure 3:
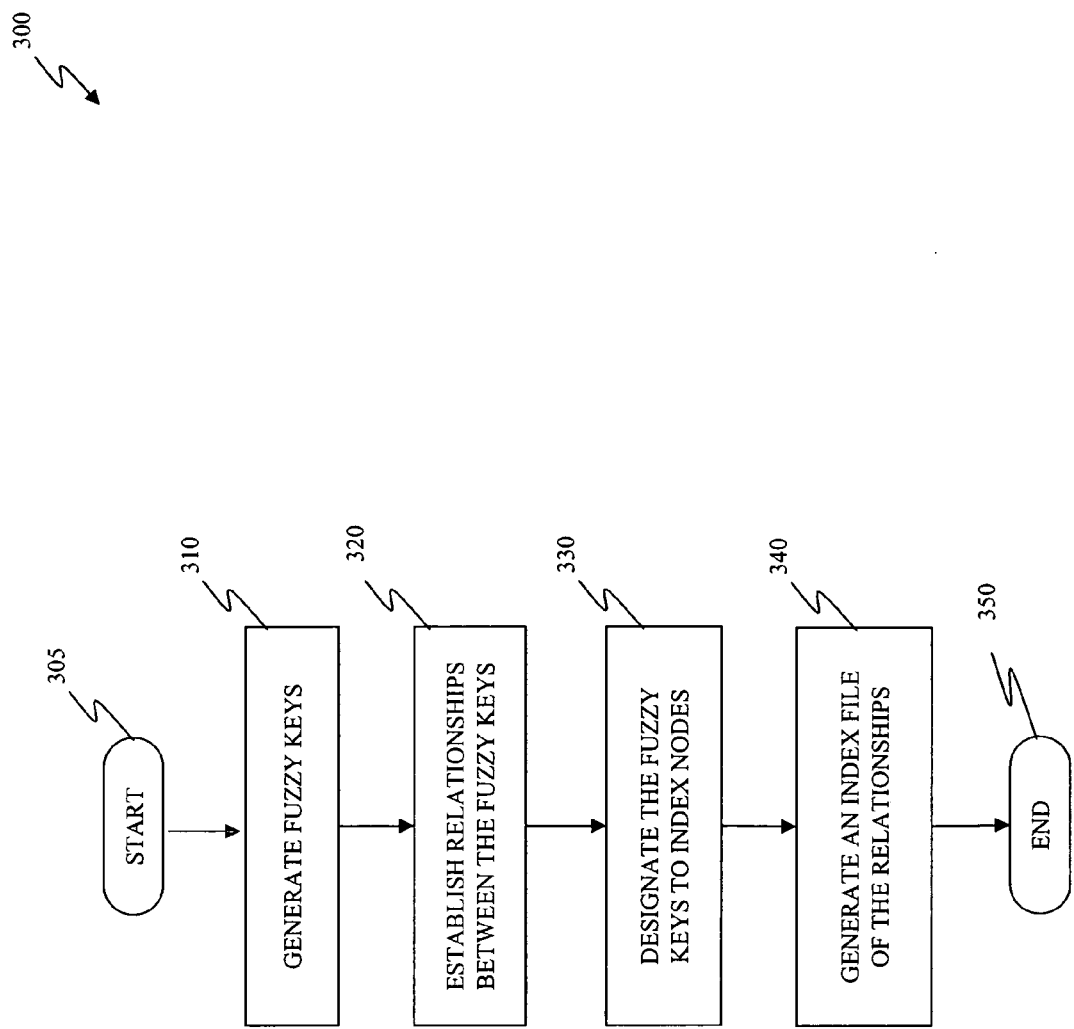
FIG. 3 illustrates a flow diagram of an embodiment of a method of indexing data carried out according to the principles of the present invention.

Turning now to FIG. 3, illustrated is an embodiment of a method of indexing data, generally designated 300, carried out according to the principles of the present invention. The method 300 begins in a step 305 with an intent to index data.

After beginning, fuzzy keys for the data are generated in a step 310. The fuzzy keys may be generated employing conventional vowel and/or phonetic replacements for each data element of the data. SOUNDEX, METAPHONE OR DOUBLE-METAPHONE algorithms may be used to generate the fuzzy keys. Of course, the fuzzy keys may be generated using other conventional fuzzy algorithms or novel fuzzy algorithms. The fuzzy keys can be generated employing a combination of fuzzy logic and conventional logic. In some embodiments, only fuzzy logic may be employed while in other embodiments, only conventional logic may be employed.

After generating the fuzzy keys, relationships between the fuzzy keys are established in a step 320. To establish the relationships, a combination of fuzzy logic and conventional logic are employed. The combination of fuzzy logic and conventional logic may vary. For example, in one instance, a majority of fuzzy logic may be used while in another instance a majority of conventional logic may be used. Additionally, in some embodiments, 100% of either fuzzy logic or conventional logic may be employed. The relationships may be based on a percentage of matching between the fuzzy keys. Desired match percentages employed to determine the relationships may be input by a user at the time of indexing or may be defined by an indexing system.

After establishing the relationships, the fuzzy keys are designated to index nodes in a step 330. The fuzzy keys may be designated to the index nodes in a sorted indexed order. The fuzzy keys may be designated to index nodes of a fuzzy key index file. In some embodiments, the fuzzy key index file is an IDX file.

After designating the fuzzy keys, an index file of the relationships is generated in a step 340. The index file may be ordered based on the relationships. The index file may be a fuzzy key relationship index file. In some embodiments, the fuzzy key relationship index file is a DDX file. A DDX file is a data description index (DDX) file. After generating the index file of relationships, the method of indexing 300 ends in a step 350.

Figure 4:
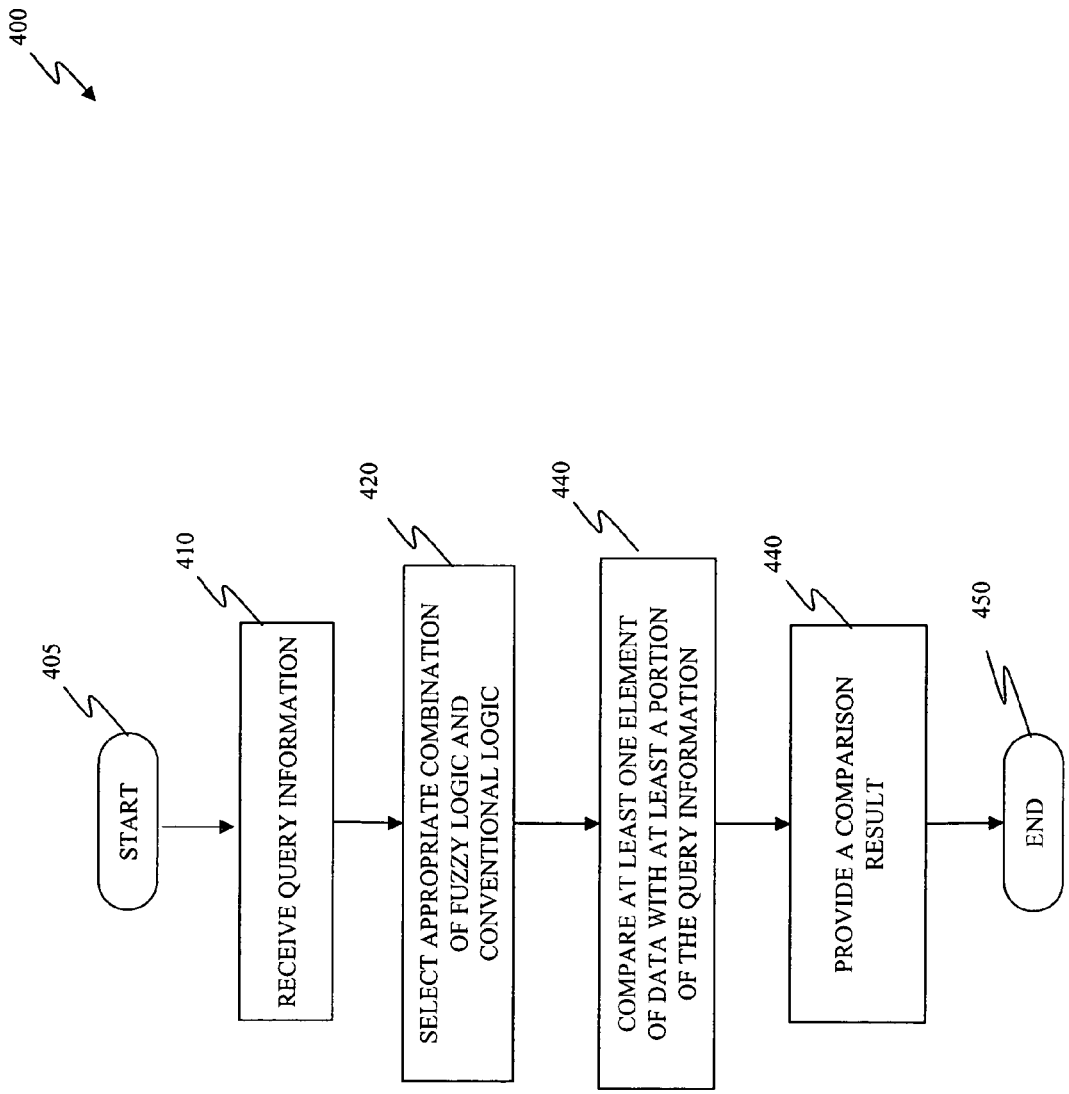
FIG. 4 illustrates a flow diagram of an embodiment of a method of querying data carried out according to the principles of the present invention.

Turning now to FIG. 4, illustrated is an embodiment of a method of querying data, generally designated 400, carried out according to the principles of the present invention. The method 400 begins in a step 405 with an intent to query data.

After beginning, query information associated with said data is received in a step 410. The query information may include at least one query element value and at least one query matching value. The query information may include multiple query element values and multiple query matching values.

After receiving the query data, an appropriate combination of fuzzy logic and conventional logic based on the query information is selected in a step 420. The fuzzy logic may include algorithms that are selected for querying based on the query information. Additionally, particular portions of the conventional logic may be employed based on the query information. The combination may include all fuzzy logic or all conventional logic.

After selecting the appropriate combination, at least one element of the data is compared with at least a portion of the query information employing the combination in a step 430. The data may be stored in a fuzzy key index file. The portion of the query information may be a query element value and/or a query matching value.

After employing the combination, a comparison result based on the comparing is provided in a step 440. In one embodiment, the comparison result is based on at least one query matching value. In other embodiments, the comparison result is based on multiple query element values and multiple query matching values. After providing the comparison result, the method of querying 400 ends in a step 450.

The present invention, therefore, provides an improved method of indexing and querying data that allows finding information using incomplete, misspelled, transposed, or restructured forms of information. The present invention may be used for data cleaning or to insure data quality. The present invention may also be used to search multiple databases of information for data elements and return comparison results that do not exactly match. This can be advantageous in searching legacy databases of different systems. For example, consider the multiple databases of various police groups, the FBI, Secret Service, etc. The present invention may be used to look for leads to crimes, terrorists, threats, etc., in the various databases that do not exactly match. Accordingly, the present invention may also assist in providing national security in addition to maintaining data quality.

Although the present invention has been described in detail, those skilled in the art should understand that they can make various changes, substitutions and alterations herein without departing from the spirit and scope of the invention in its broadest form.

What is claimed is:

1. An indexing engine comprising:
    a computing device;
    a key constructor configured to generate fuzzy keys for data; and
    an index generator configured to select an appropriate combination of fuzzy logic and conventional logic to establish matching percentages between said fuzzy keys, designate said fuzzy keys to nodes of an index and generate an additional index based on said matching percentages, wherein at least a portion of said fuzzy logic or said conventional logic is designated for certain data types and said index generator is configured to select said appropriate combination based on a type of said data.

2. The indexing engine as recited in claim 1 wherein said index is a fuzzy key index file and said additional index is a fuzzy key relationship index file.

3. The indexing engine as recited in claim 2 wherein said fuzzy key relationship index file is ordered based on said matching percentages.

4. The indexing engine as recited in claim 1 wherein said data is from a flat file and said index is stored in said flat file.

5. The indexing engine as recited in claim 1 wherein said data includes multiple columns of said data.

6. The indexing engine as recited in claim 1 wherein at least one of said index nodes includes unequal elements of said data.

7. The indexing engine as recited in claim 1 wherein at least a portion of said fuzzy logic or said conventional logic is specifically created for and designated to establish said matching percentages for said certain data types.

8. The indexing engine as recited in claim 1 wherein said data is selected from multiple databases.

9. The indexing engine as recited in claim 8 wherein said multiple databases are distributed over a network.

10. The indexing engine as recited in claim 1 wherein said index generator is further configured to receive indexing instructions from a user and establish said matching percentages based thereon.

11. The indexing engine as recited in claim 1 wherein at least one of said matching percentages is established by user-input.

12. The indexing engine as recited in claim 11 wherein said user-input is received by said indexing engine at a time of generating said additional index.

13. A method of indexing data, comprising:
    generating fuzzy keys for said data;
    establishing matching percentages between said fuzzy keys employing an appropriate combination portion of fuzzy logic or conventional logic, wherein at least a portion of said fuzzy logic or said conventional logic is designated for certain data types and said appropriate combination is selected based on a type of said data;
    designating the fuzzy keys to index nodes of a first index;
    generating a second index based on said matching percentages; and
    storing said first index and said second index in index files, wherein said generating fuzzy keys, said establishing, said designating, and said generating said second index are each performed by an indexing engine.

* * * * *